United States Patent [19]
Parker et al.

[11] Patent Number: 5,219,671
[45] Date of Patent: Jun. 15, 1993

[54] HYDROGEN GENERATION AND UTILITY LOAD LEVELING SYSTEM AND THE METHOD THEREFOR

[75] Inventors: Robin Z. Parker, Miami; Robert J. Hanrahan; Avinash K. Gupta, both of Gainesville, all of Fla.

[73] Assignee: Solar Reactor Technologies, Inc., Miami, Fla.

[21] Appl. No.: 526,435

[22] Filed: May 22, 1990

Related U.S. Application Data

[63] Continuation-in-part of Ser. No. 393,814, Dec. 14, 1987, abandoned, which is a continuation-in-part of Ser. No. 804,518, Dec. 4, 1985, abandoned.

[51] Int. Cl.$^5$ .......................... C01B 7/00; C25B 1/02; H01M 8/04; H01M 8/18
[52] U.S. Cl. ..................... 429/17; 204/128; 204/129; 204/157.48; 204/157.5; 204/157.52; 204/252; 429/19; 429/20
[58] Field of Search ............... 204/157.48, 129, 128, 204/157.5, 157.52, 252; 429/17, 19, 20

[56] References Cited

U.S. PATENT DOCUMENTS

| | | | |
|---|---|---|---|
| 4,051,005 | 9/1977 | Krascella | 204/157.48 |
| 4,097,348 | 6/1978 | Gomberg | 204/157.48 |
| 4,124,741 | 11/1978 | Hart | 204/129 |
| 4,620,907 | 11/1986 | Gomberg | 204/157.48 |
| 4,725,341 | 2/1988 | Minz | 204/129 |

OTHER PUBLICATIONS

B. Reichman et al. "Photoproduction of Halogens Using Platinized TiO$_2$", NASA Tech Briefs, (Winter 1980), vol. 5, No. 4, pp. 449, 450.
Spaziante, P. M. et al.; Hydrogen/Halogen Energy Storage System: Safety, Performance, and Cost Assessment-Final Report, Feb. 1979; Brookhaven National Laboratory, Upton, New York 11973.

Primary Examiner—Wayne Langel
Attorney, Agent, or Firm—Cushman, Darby & Cushman

[57] ABSTRACT

Disclosed are an apparatus and method for the electrolytic, thermal, and photolytic production of hydrogen and oxygen. In the first step of the cycle a concentrated hydrohalic acid solution is electrolyzed to produce hydrogen, halogen, and dilute hydrohalic acid solution. In the second, or hydrogen halide formation and electrolyte reformation step, the halogen is reacted with steam in a gas phase thermal and photolytic process to reform the hydrogen halide and produce oxygen. An advantage of the novel reformation step is the ability to utilize a contaminated water feedstream for the production of the reusable hydrogen halide.

The present invention also provides both an apparatus and method for the radiation-augmented electrolytic and thermal production of hydrogen and oxygen. Reduction of electrical and thermal energy requirements is achieved by using radiation to: (i) activate photo-sensitive metallic hexahalide ions, which reduces the electrolysis electrode potential; and (ii) energize a portion of the hydrogen halide formation reaction. By utilizing radiation-augmented electrolysis, the conventional halogen oxidation reaction is replaced by oxidation of a metallic hexahalide, which occurs at a lower overvoltage and smaller reversible cell potential. Radiant energy thus both replaces electrical energy for the production of hydrogen, and increases the efficiency of electrical energy storage.

23 Claims, 5 Drawing Sheets

HYDROGEN GENERATION AND UTILITY LOAD LEVELING SYSTEM AND THE METHOD THEREFOR

This patent application is a continuation-in-part of Ser. No. 07/393,814, filed Dec. 14, 1987, abandoned, which in turn is a continuation-in-part of Ser. No. 804,518 filed Dec. 4, 1985, abandoned.

BACKGROUND OF THE INVENTION

1. Field of the Invention

The present invention relates generally to an apparatus and method for generating hydrogen and oxygen. The invention relates more specifically to an apparatus and method for the solar-augmented electrolytic and thermal production of hydrogen and oxygen, with the hydrogen either exported from the system as a product, or retained as fuel for an electrolytic fuel cell. The invention thus further relates to an integrated, continuously- or intermittently-operable system providing both hydrogen and oxygen generation and utility load leveling capabilities.

2. Description of the Related Art

Hydrogen, a clean burning fuel and raw material for the manufacture of numerous products, is conventionally produced from limited and non-renewable fossil fuels, or from water. Though water is abundant and renewable, it is a very stable compound because of the strength of the hydrogen - oxygen bond. Accordingly, using water as the feedstock to produce hydrogen requires a substantial energy input.

Past well-known methods of producing hydrogen from water involve the electrolysis of a potassium, or sodium hydroxide, or sulfuric acid electrolyte. Most recently the use of Solid Polymer Electrolytes (SPE) and Proton Exchange Membranes (PEM) has allowed the direct electrolysis of water. All of these processes require the input of substantial electrical energy and a demineralized water feedstream.

Another well-known electrolytic process, utilized much more frequently than water electrolysis, is the industrial electrolysis of aqueous alkaline chlorides to produce chlorine and caustic soda. Also, in the chlorination of organic compounds, much of the chlorine is retained in the form of hydrogen chloride or hydrochloric acid. The recovery of the chlorine from aqueous and gaseous hydrogen chloride is of great importance to the chloralkaline industry; this is commonly achieved either electrolytically or thermally.

Thermal recovery of chlorine from hydroge chloride is conventionally accomplished by the "Deacon Process." In this process hydrogen chloride is oxidized with oxygen, typically at 400°-450° C., producing chlorine and water. U.S. Pat. No. 4,799,357 describes a method and apparatus for dissociating hydrogen chloride by using solar, thermal, and photolytic energy with copper or silver as a reagent. Solar recovery of chlorine from hydrochloric acid has also been suggested by H. B. Gray, *Science,* Vol. 214 (1981), 1201, using the transition metal complex ion, hexachloroiridiate (IV). The crystal field and electron transfer spectra of Group VIII transition metal complexes has been described by C. K. Jorgensen, *Acta Chimica Scandanavica,* Vol. 10, No. 4 (1956), 500, 518; Vol. 11, No 1 (1957), 151, 166.

The solar conversion of water and chlorine into hydrochloric acid and oxygen has been investigated by numerous researchers over a two hundred year period, as described by J. W. Mellor, *A Comprehensive Treatise on Inorganic and Theoretical Chemistry,* (1956). The reaction is both slow and inefficient, however, and has not been applied to practical use. The reaction of steam and chlorine to produce hydrochloric acid and oxygen has been well known, as documented by E. R. Riegel, *Industrial Chemistry,* Fifth Ed., (1949).

The electrolysis of hydrochloric acid to produce hydrogen and chlorine is described in U.S. Pat. No. 4,239,607, which discloses a method and apparatus using carbon slurry electrodes to increase the electrode surface area, and therefore attempt to lower the cell overvoltage.

The electrolysis of hydrochloric acid into hydrogen and chlorine and their subsequent recombination has been investigated by the U.S. Department of Energy, "Hydrogen/Halogen Energy Storage System, Final Report," Brookhaven National Laboratories, February 1979. The report describes a proposed utility load leveling battery using regenerative hydrogen chlorine cells. The proposed battery would have been cyclically charged as an electrolysis cell producing hydrogen and chlorine with off-peak electrical power, and discharged as a hydrogen/chlorine fuel cell to produce peaking power and thereby provide load leveling.

SUMMARY OF THE INVENTION

It is an object of this invention to provide an improved apparatus and method for generating hydrogen and oxygen from water.

It is an additional object of the present invention to provide an apparatus and method for the solar-augmented electrolytic and thermal production of hydrogen and oxygen.

It is another object of the present invention to provide an apparatus and method for the solar-augmented electrolysis of hydrohalic acid to produce a halogen gas.

It is another object of the present invention to provide an apparatus and method for an integrated, continuously- or intermittently-operable system providing both hydrogen and oxygen generation, and utility load leveling capabilities.

It is another object of the present invention to provide an apparatus and method for both the formation of hydrogen halide, and reformation of hydrohalic acid employed in the electrolysis cell.

It is still another object of the present invention to provide an apparatus and method for the production of potable water from a contaminated water feedstream.

Accordingly, the present invention provides both an apparatus and method for the electrolytic production of hydrogen, and the thermal and photolytic production of oxygen. In the first step of the cycle a concentrated hydrohalic acid solution is electrolyzed to produce hydrogen, halogen, and dilute hydrohalic acid solution. In the second, or hydrogen halide formation and electrolyte reformation step, the halogen is reacted with steam in a gas phase thermal and photolytic process to reform the hydrogen halide and produce oxygen. An advantage of the novel reformation step is the ability to utilize a contaminated water feedstream for the production of the reusable hydrogen halide.

The present invention also provides both an apparatus and method for the radiation-augmented electrolytic production of hydrogen and oxygen. Reduction of electrical and thermal energy requirements is achieved by using radiation to: (i) activate photo-sensitive metallic hexahalide ions, which reduces the electrolysis electrode potential; and (ii) energize the hydrogen halide formation reaction. By utilizing radiation-augmented electrolysis, the conventional halogen oxidation reaction is replaced by oxidation of a metallic hexahalide, which occurs at a lower overvoltage and smaller reversible cell potential. Radiant energy thus both replaces electrical energy for the production of hydrogen, and increases the efficiency of electrical energy storage.

BRIEF DESCRIPTION OF THE DRAWINGS

Other objects, features, and advantages of the present invention will become more fully apparent from the following detailed description of the preferred embodiments, the appended claims, and the accompanying drawings. As depicted in the attached drawings:

DESCRIPTION OF THE PREFERRED EMBODIMENTS

The present invention will be disclosed in terms of the currently perceived preferred embodiments thereof.

By way of example, the present invention will be disclosed in connection with Group VIII transition metals, halogens, and halide ions. For illustrative purposes, iridium is disclosed as the transition metal, and chlorine as the halogen component.

The radiation flux employed may generally be described as electromagnetic radiation. Preferably, solar rays are the source of that radiation. It should be readily apparent to those skilled in the art, however, that other sources of radiation energy might be suitably employed. Exemplary alternative sources include photons generated from nuclear-excited flash lamps, alpha particles, beta particles, gamma rays, x-rays, protons, or fission fragments.

The present invention facilitates use of different combinations of solar, thermal, and electrical power in an integrated system for hydrogen production and/or utility load leveling.

A fundamental basis of the first embodiment of the present invention lies in the fact that the voltage required to electrolyze a hydrochloric acid solution is less than that required to electrolyze water. In the electrolysis of hydrochloric acid, hydrogen is liberated at the cathode and chlorine is liberated at the anode, whereas in the electrolysis of water, hydrogen is liberated at the cathode and oxygen is liberated at the anode. Furthermore, both the E. value for the chlorine half cell and the overpotential of chlorine are lower than that for oxygen. Additionally, as a result of the temperature dependence of the E° value, increased ion mobility at high temperature leading to decreased IR drop, and diminished overvoltage, the voltage required to electrolyze HCl decreases with an increase in temperature.

The water-chlorine cycle employed in the first illustrative embodiment uses electrical, thermal, and photolytic energy to convert water to hydrogen and oxygen as marketable products. The process reverses the hydrogen combustion reaction (1) in two steps, using chlorine as an intermediate which is not consumed. The reactions and their enthalpies at 298 K are:

$H_2$—$O_2$ reaction

$H_2$—$Cl_2$ reaction

Electrolyte reformation reaction

HCl electrolysis

Reaction (4), the major energy-consuming step, uses electrical power to electrolyze the HCl formed by Reaction (3). The cost of producing hydrogen by electrolysis is proportional to the voltage of the electrolysis cell.

In the first step of the hydrogen production (or battery charging) cycle, a concentrated hydrochloric acid solution is electrolyzed to produce hydrogen, chlorine, and dilute hydrochloric acid solution. In the second, or hydrogen halide formation and electrolyte reformation step, the chlorine is reacted with steam in a gas phase thermal process to form hydrogen chloride and oxygen, and then solvated.

Figure 1A:
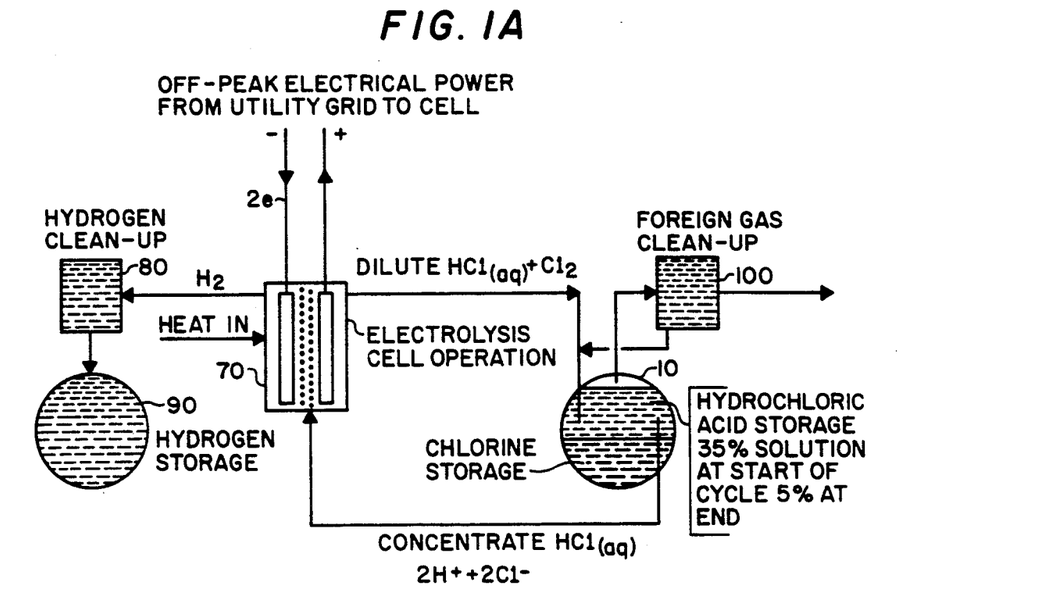
FIG. 1 is a schematic block diagram of the apparatus and method embodied by a conventional hydrogen-halogen load leveling battery.
Figure 1B:
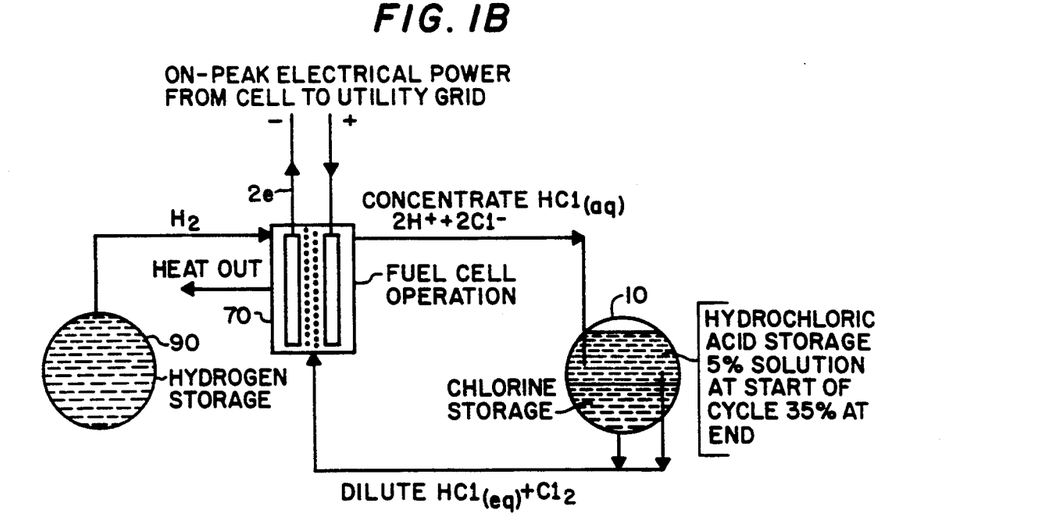
Figure 2:
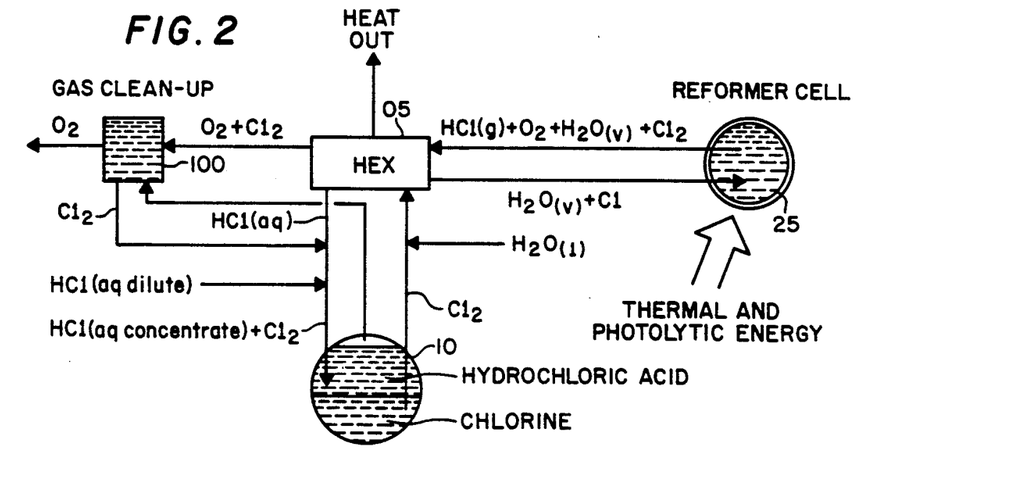
FIG. 2 is a schematic block diagram of the apparatus and method embodied by the hydrogen halide formation, and electrolyte reformation, modes of operation of the present invention.

The apparatus and method of an illustrative embodiment of the invention will now be described with reference to FIG. 2. In the hydrogen halide formation mode of operation, chlorine from acid and chlorine storage vessel 10 and liquid water are conveyed to heat exchange apparatus 05 for preheating. The gaseous chlorine and water are then further heated in reformer cell 25 by means of both thermal and photolytic energy, where they react to produce hydrogen chloride and oxygen, with equilibrium amounts of steam and chlorine.

In the electrolyte reformation mode of operation, the aforementioned hydrogen chloride, oxygen, steam, and chlorine are then cooled in heat exchange apparatus 05, where the condensed water acts to solvate the hydrogen chloride to dilute hydrochloric acid. Gaseous oxygen and chlorine are vented and conveyed to gas clean-up unit 100.

The hydrogen halide formation process has been examined in detail and found to be feasible at 600° C., and to occur with good yields and without undesired by-products. At 600° C., an HCl yield of 79.9% and an $O_2$ yield of 79.3% were achieved.

The oxygen produced during the formation step can be separated from the chlorine using any suitable conventional separation technique. Exemplary techniques include separation based on boiling points, in which the mixture is cooled to $-40°$ C. to liquefy the chlorine while oxygen remains in the gaseous phase; membrane separation; differential adsorption; and flow separation, based on the solubility of chlorine in a solution of hydrochloric acid.

In the flow technique, a mixture of chlorine and oxygen is passed through a solution of hydrochloric acid flowing downward. The solubility of $Cl_2$ increases in an HCl solution, due to the formation of $Cl_3^-$:

$$Cl_2 + Cl^- \rightarrow Cl_3^-$$

Oxygen will move in the upward direction, thus separating the two gases. In the reformation of HCl from chlorine and steam, if chlorine issued as a limiting reactant, only a small amount of unreacted chlorine will be present with a large quantity of oxygen.

In a variation of the first illustrative embodiment, the invention produces hydrogen while operating as a load leveling battery by charging and discharging at different current densities. By maintaining the voltage at a nearly constant value, but increasing the current density substantially on charging, the rate and amount of hydrogen produced increases. Though the power consumed during charging will increase as a result of the increased current density, it is lower-cost, off-peak power. Optionally, the same effect could be attained by charging for a longer period of time than the time of discharge.

Of the increased amount of hydrogen produced during the charging cycle, a portion is utilized in the fuel cell discharge mode, and the balance is available for export as a product. The additional hydrochloric acid required for the surplus hydrogen production is attained through electrolyte reformation from the chlorine produced during the battery charging cycle.

In an additional illustrative embodiment of the present invention, an apparatus and method for the solar-augmented electrolytic and thermal production of hydrogen and oxygen are provided. Reduction of electrical and thermal energy requirements is achieved by using solar energy to: (i) activate photo-sensitive metallic hexahalide ions, which reduces the electrolysis electrode potential; and (ii) energize a portion of the hydrogen halide reformation reaction. By utilizing solar-augmented electrolysis, the conventional halogen oxidation reaction is replaced by oxidation of the metallic hexahalide, which occurs at a lower overvoltage and smaller reversible cell potential. Solar energy thus replaces both electrical power and thermal energy to eliminate a significant portion of the cost of either hydrogen production or electrical energy storage.

The present invention describes a method for both hydrogen production and electrical energy storage by utilizing a combination of electrolysis, photolysis, and electrolyte reformation. The electrolysis process is based on the electrochemistry of a hydrohalic acid electrolyte. The photolytic process is based on the photochemistry of transition metal complex ions.

The aqueous hydrohalic electrolyte contains another electrolyte, consisting of a metallic element of the type known as a Group VIII transition or post-transition element, along with a suitable counter-ion of opposite charge. The metallic element will be in a positive oxidation state. The overall charge of the complex ion, e.g., a metallic hexahalide $ZX_6$, where Z is the transition metal and $X_6$ is the hexahalide, could be minus three $(-3)$, or $ZX_6^{-3}$.

Under the influence of an electric field, the negative ion $ZX_6^{-3}$ migrates toward the anode, where it is oxidized, leading to an ion of minus two $(-2)$ charge:

$$ZX_6^{-3} \rightarrow ZX_6^{-2} + e^-.$$

The species $ZX_6^{-2}$ is then exposed to visible light, whereby it is promoted to an excited electronic state:

$$ZX_6^{-2} + h\nu \rightarrow (ZX_6^{-2})^*.$$

The $(ZX_6^{-2})^*$ is then able to oxidize the halide ion in a hydrohalic acid, for example, which has a minus one $(-1)$ oxidation state, to the elemental halogen, which has a zero oxidation state:

$$(ZX_6^{-2})^* + X^- \rightarrow ZX_6^{-3} + \tfrac{1}{2}X_2$$

To ensure that the process proceeds as desired, it is required that the $ZX_6^{-2}$ absorb visible light more strongly than the $ZX_6^{-3}$. This condition can be achieved by providing these species in the form of the indicated complex ions. These species consist of a central Group VIII metallic ion in the positive oxidation state, surrounded and bound to one or more charged or neutral ions or molecules referred to as ligands.

Exemplary metallic ion species include Fe, Co, Ni, Ru, Rh, Pd, Os, Ir, and Pt. Typical oxidation states of these ions may range from +1 to +8. Typical ligands include molecules such as $HO_2$, $NH_3$, and CO, as well as ions such as $CN^-$, $NO_2^-$, $Cl^-$, $Br^-$, and $I^-$.

An example of the photochemical effect of transition metal complex ions is the charge transfer transition in $IrCl_6^{-3}$ when subjected to radiation at visible wavelengths. This reaction is described by H. B. Gray, *Science*, Vol. 214 (1981), 1201:

$$IrCl_6^{-2} + Cl^- + h\nu \rightarrow IrCl_6^{-3} + \tfrac{1}{2}Cl_2 \qquad (5)$$

In principle, a related charge transfer transition in $IrCl_6^{-3}$ could facilitate the reduction of protons, completing a cycle that produces hydrogen and chlorine from HCl and water:

$$IrCl_6^{-3} + H^+ + h\nu \rightarrow IrCl_6^{-2} + \tfrac{1}{2}H_2 \qquad (6)$$

Since the absorption coefficient of $IrCl_6^{-3}$ is more than an order of magnitude smaller than that of $IrCl_6^{-2}$ at solar wavelengths, however, the quantum yield for the formation of $H_2$ is small. Reaction (6) is therefore not feasibly integrated in a practical cycle.

A high quality aspect of solar radiation is the short average wavelength of solar photons of approximately 500 nm. The energy of an average solar photon is sufficient to cause selected photochemical reactions which can produce energy which may then be stored for subsequent use. Photochemical research has demonstrated that when HCl solutions containing $IrCl_6^{-2}$ ions are irradiated, $IrCl_6^{-3}$ and chlorine gas are produced. The lower overvoltage and smaller reversible cell potential associated with the anodoic oxidation of $IrCl_6^{-3}$ is the basis for employing solar energy to reduce the cost of producing electrolytic hydrogen and oxygen.

Solar-augmented electrolysis thus comprises supplying an aqueous solution of HCl and $IrCl_6^{-2}$ to a photolysis cell, which is irradiated to reduce the $IrCl_6^{-2}$ to $IrCl_6^{-3}$ and produce gaseous $Cl_2$, which is continuously swept from the cell. The aqueous solution of HCl and $IrCl_6^{-2}$ is then introduced into an anode half cell which is separated from the cathode half cell by a semipermeable membrane. An electrical potential is applied across the anode and the cathode, whereby $IrCl_6^{-3}$ is oxidized to $IrCl_6^{-2}$ at the anode, and $H_2$ is evolved at the cathode.

Of the two redox reactions (5) and (6), reaction (5) is spontaneous in the presence of sunlight and reaction (6) is not. In an embodiment of the present invention, the redox reactions are therefor organized such that the photolysis reaction in a separate photocell may combined with conventional electrolysis.

Conventional electrolysis of HCl(aq) consists of the following half reactions:

$$2H^+ + 2e^- \rightarrow H_2(gas) \text{ Cathode} \quad (7)$$

$$2Cl^- \rightarrow Cl_2(gas) + 2e^- \text{ Anode} \quad (8)$$

In the process according to the present invention, reaction (7) is unchanged. The anode reaction is replaced with a cycle including the photochemical redox reaction (5) and an electrolysis half-cell reaction. The mechanism of the solar-augmented anode reaction is as follows:

$$IrCl_6^{-2} + h\nu \rightarrow IrCl_6^{-2*} \quad (9)$$

$$IrCl_6^{-2*} + Cl^- \rightarrow IrCl_6^{-3} + \tfrac{1}{2}Cl_2 \quad (10)$$

$$IrCl_6^{-3} \rightarrow IrCl_6^{-2} + e^- \quad (11)$$

Reaction (9) is the photo excitation step; reaction (10) represents the electron transfer from the chloride ion to the excited iridium chloride; and, reaction (11) represents the donation of an electron by $IrCl_6^{-3}$. The overall reaction may thus be generically represented as:

$$[aq\ H^+ + Cl^-] + [aq\ IrCl_6^{-2}] + h\nu + e^- \rightarrow \tfrac{1}{2}H_2 + \tfrac{1}{2}Cl_2 \quad (12)$$

Reaction (12) thus illustrates the overall photolysis and electrolysis of hydrochloric acid in an aqueous solution seeded with iridium hexachloride.

Though the photolysis step has been described in terms of the use of a single species of metallic hexahalide, other embodiments thereof are possible. To supplement the individual absorption spectrum and thereby provide a broader band and more continuous absorption of photolytic energy, more than one type of metallic hexahalide may be used simultaneously. Thus, exemplary multi-metallic hexahalide solutions could include $RuCl_6/RhCl_6/IrCl_6$, or any suitable combination of the Group VIII metals in conjunction with a single halogen species. The metallic hexahalides selected are those with a half-cell potential which is lower than that of the halogen gas alone, to ensure that the gas is not evolved at the anode.

Figure 3:
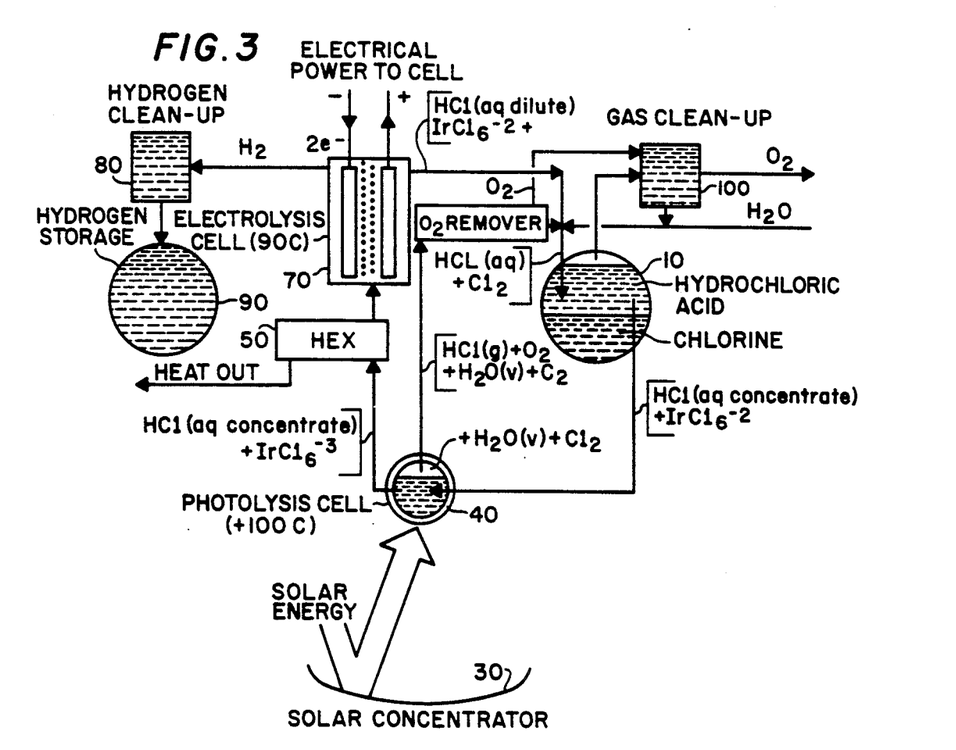
FIG. 3 is a schematic block diagram of the apparatus and method preferably embodied by the radiation-augmented, hydrogen-halogen battery for the production of hydrogen and oxygen.

The apparatus and method of an additional illustrative embodiment will now be described with reference to FIG. 3. In the solar-augmented mode of operation, a concentrated aqueous solution of HCl and $IrCl_6^{-2}$ is conveyed from acid and chlorine storage vessel 10 to photolysis cell 40. Solar radiation is introduced into the photolysis cell by means of solar concentrator 30. To ensure that the photolytic reaction proceeds, the chlorine evolved must be swept from the photolytic solution and conducted away from the cell. Exemplary methods of effecting the chlorine sweep are based on partial pressure reduction, and include steam stripping or boiling with an inert gas. The chlorine conducted from the photolysis cell is utilized to produce HCl by means of the electrolyte reformation process. The $IrCl_6^{-3}$ produced in the photolysis step is conducted to the anode chamber of electrolysis cell 70.

Since the operating temperature of the photolysis cell is preferably above 100° C. and that of the electrolysis cell is below 90° C., means are provided for further enhancing the thermal efficiency of the process by recovering heat from the $IrCl_6^{-3}$/HCl stream through a conventional heat exchange apparatus 50. The anode chamber of the electrolysis cell is separated from the cathode chamber by a semipermeable membrane. Means are provided for applying an electrical potential across the anode and cathode cells.

Gaseous hydrogen evolved in the cathode cell is conveyed to hydrogen clean-up unit 80 for the removal of impurities, and introduced to hydrogen storage vessel 90. $IrCl_6^{-2}$ evolved in the anode cell and the dilute aqueous solution of HCl are conveyed to acid and chlorine storage vessel 10. Oxygen gas produced during the hydrogen halide formation process is withdrawn and delivered to foreign gas clean-up unit 100 for removal of impurities.

Figure 4:
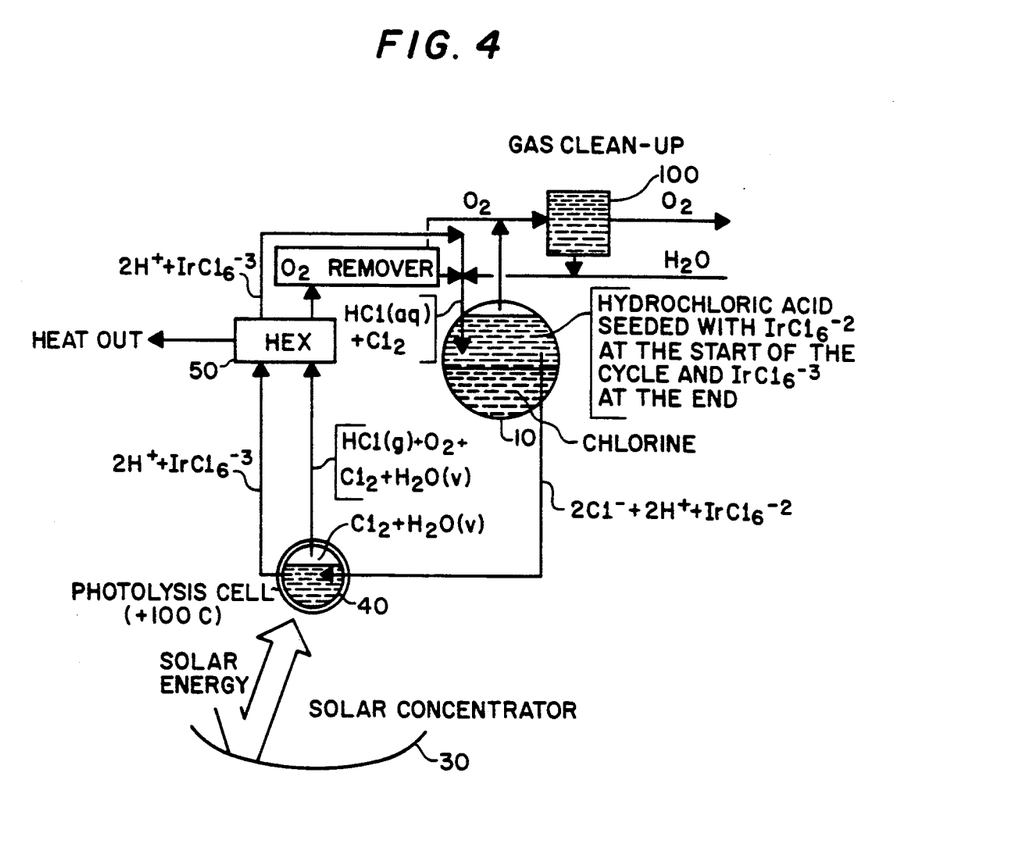
FIG. 4 is a schematic block diagram of the apparatus and method preferably embodied by the electrolyte-conditioning and -storage mode of operation of the present invention.

The apparatus and method of another illustrative embodiment will now be described with reference to FIG. 4, which depicts the electrolyte-conditioning and -storage mode of operation of the present invention. During the solar day, a hydrochloric acid solution seeded with $IrCl_6^{-2}$ at the start of the cycle is photolyzed to establish an inventory of $IrCl_6^{-3}$. The $IrCl_6^{-3}$ is then stored for subsequent electrolysis during periods of off-peak power.

In the electrolyte-conditioning mode of operation, an aqueous solution of HCl and $IrCl_6^{-2}$ is conveyed from acid and chlorine storage vessel 10 to photolysis cell 40. Solar radiation is introduced into the photolysis cell by means of solar concentrator 30. Chlorine evolved in the photolysis step is conducted away from the photolysis cell, and is reformed to HCl by means of the electrolyte reformation process. The $IrCl_6^{-3}$ produced in the photolysis step is then cooled in heat exchanger 50 and returned to acid and chlorine storage vessel 10.

Figure 5:
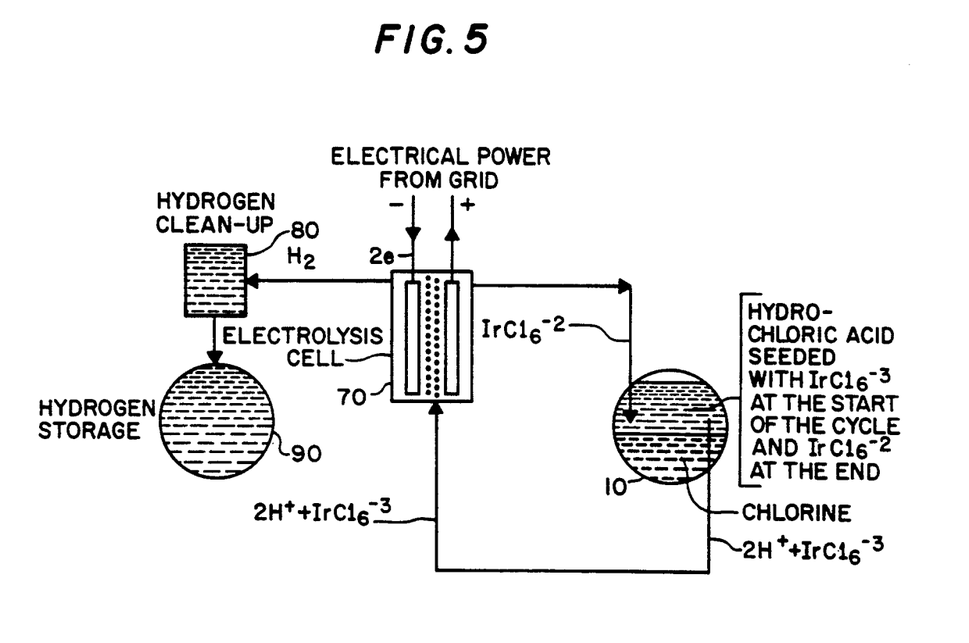
FIG. 5 is a schematic block diagram of the apparatus and method preferably embodied by the charging of the radiation-augmented battery mode of operation of the present invention.

The apparatus and method of another illustrative embodiment will now be described with reference to FIG. 5, which depicts the charging of the radiation-augmented battery mode of operation of the present invention. This embodiment utilizes the preconditioned inventory of $IrCl_6^{-3}$ generated during the solar day for the electrolytic production of hydrogen during periods of off-peak power.

In the radiation-augmented battery mode of operation, an aqueous solution of HCl and $IrCl_6^{-3}$ is conveyed from acid and chlorine storage vessel 10 to electrolysis cell 70. Gaseous hydrogen evolved in the cathode cell is conveyed to hydrogen clean-up unit 80 for the removal of impurities, and introduced to hydrogen storage vessel 90. $IrCl_6^{-2}$ evolved in the anode cell and the aqueous solution of HCl are conveyed to acid and chlorine storage vessel 10.

Figure 6:
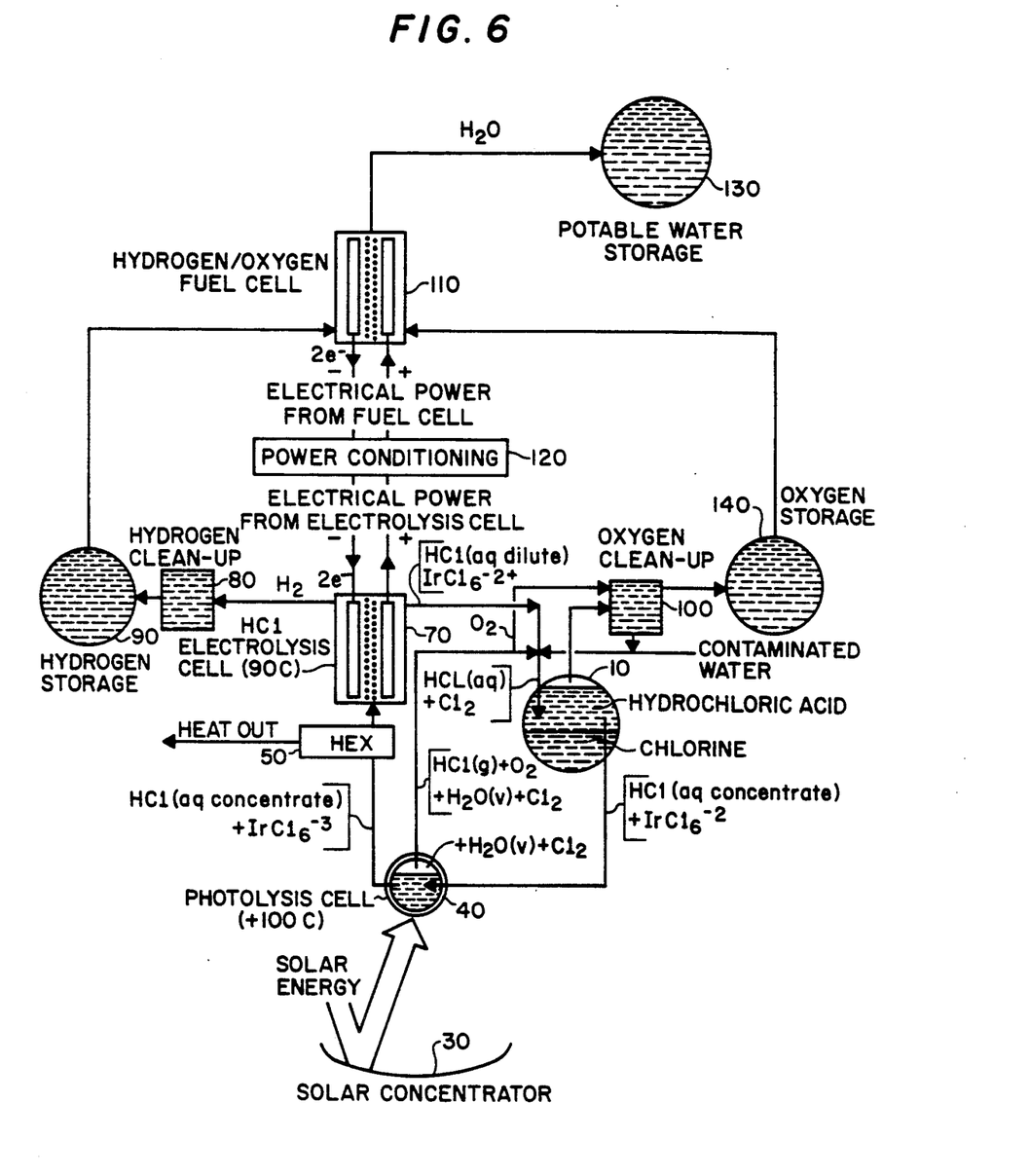
FIG. 6 is a schematic block diagram of the apparatus and method preferably embodied by the potable water production mode of the present invention.

The apparatus and method of another illustrative embodiment will now be described with reference to FIG. 6, which depicts the potable water production mode of the present invention. This embodiment represents an integrated system for the production of potable water from the hydrogen and oxygen generated during solar-augmented electrolysis.

A contaminated water feedstream may be utilized in the process for reformation of the hydrogen chloride. Hydrogen produced during solar-augmented electrolysis, and oxygen produced during the reformation step, are combined in fuel cell 110 to generate electrical power and potable water. The electrical power is conducted to power conditioning unit 120 for subsequent use in electrolysis cell 70.

While the present invention has been disclosed in connection with the preferred embodiments thereof, it should be appreciated that there may be other embodiments of the present invention which fall within the spirit and scope of the present invention as defined by the appended claims.

What is claimed is:

1. A continuous method of providing load leveling and hydrogen and oxygen production from one system comprising the steps of:
   electrolyzing concentrated hydrohalic acid into hydrogen, halogen and dilute hydrohalic acid;
   photochemically and thermally reacting water with said halogen to produce hydrogen halide and oxygen;
   separating said oxygen from said hydrogen halide; and
   producing concentrated hydrohalic acids by solvating said hydrogen halide with dilute hydrohalic acid,
   wherein said system utilizes a cell having a charging current density and a discharging current density, said charging and discharging having a period of time.

2. The method of claim 1, further comprising the step of providing electrical power storage concurrently with hydrogen and oxygen production by utilizing a cell charging current density greater than a cell discharge current density, to produce more molecular hydrogen and halogen on charging than that which is consumed on discharging.

3. The method of claim 1, further comprising the step of providing electrical power storage concurrently with hydrogen and oxygen production by charging for a longer period of time than a time of discharge.

4. A method of photolysis, comprising the steps of:
   using photolytic energy to excite a transition metal halide complex in solution with a hydrohalic acid, causing a metal ion-ligand to be photochemically reduced to a lower oxidation state, and halide ions to be oxidized to molecular halogen; and
   continuously removing said molecular halogen from the presence of the photolytic reaction.

5. The method of claim 4, further comprising the use of two or more transition metal halide complexes in solution with said hydrohalic acid simultaneously.

6. The method of claim 4 or claim 5, further comprising the use of electrical energy to electrolyze said photochemically reduced, transition metal halide complexes in solution with a hydrohalic acid, causing said metal ion-ligand to be electrolytically oxidized to a higher oxidation state of that species, and hydrogen ions to be reduced to molecular hydrogen.

7. A method of producing molecular hydrogen and halogens from hydrohalic acid in solution with transition metal halide complexes comprising:
   using photolytic energy to excite a transition metal halide complex in solution with a hydrohalic acid, causing a metal ion-ligand to be photochemically reduced to a lower oxidation state, and halide ions to be oxidized to molecular halogen;
   continuously removing said molecular halogen from the presence of the photolytic reaction; and
   using electrical energy to electrolyze said photochemically reduced, transition metal halide complexes in solution with said hydrohalic acid, causing said metal ion-ligand to be electrolytically oxidized to a higher oxidation state of that species, and hydrogen ions to be reduced to molecular hydrogen.

8. A continuous method of providing load leveling and hydrogen and oxygen production from one system, comprising the steps of:
   using photolytic energy to excite a transition metal halide complex in solution with a hydrohalic acid, causing a metal ion-ligand to be photochemically reduced to a lower oxidation state, and halide ions to be oxidized to molecular halogen;
   continuously removing said molecular halogen from the presence of the photolytic reaction;
   using electrical energy to electrolyze said photochemically reduced, transition metal halide complexes in solution with said hydrohalic acid, causing said metal ion-ligand to be electrolytically oxidized to a higher oxidation state of that species, and hydrogen ions to be reduced to molecular hydrogen;
   photochemically and thermally reacting water with said molecular halogen to produce hydrogen halide and oxygen;
   separating said oxygen from said hydrogen halide; and
   producing concentrated hydrohalic acid by solvating said hydrogen halide with dilute hydrohalic acid.

9. The method of claim 8, further comprising the step of providing electrical power storage concurrently with hydrogen and oxygen production by utilizing a cell charging current density greater than a cell discharge current density, to produce more molecular hydrogen and halogen on charging than that which is consumed on discharging.

10. The method of claim 8, further comprising the step of providing electrical power storage concurrently with hydrogen and oxygen production by charging for a longer period of time than a time of discharge.

11. The method of claim 4, 5, 7, or 8, wherein said photolysis occurs during the solar day, with said photochemically reduced metal ion-ligand stored for subsequent electrolysis.

12. The method of claim 6, 7, 8, or 9, wherein said electrolysis occurs during the night with off-peak electrical energy.

13. The method of claim 8, 9, or 10, further comprising the production of potable water and electrical power from a contaminated water feedstream by combining said hydrogen and said oxygen in a fuel cell.

14. The method of claim 4, 5, 7 or 8, further comprising the addition of an excess of halide ions to said hydrohalic acid.

15. The method of claim 1, 7, or 8, further comprising the recovery of excess thermal energy.

16. A continuous load leveling and hydrogen and oxygen production system comprising:
   means for electrolyzing concentrated hydrohalic acid into hydrogen, halogen and dilute hydrohalic acid;

means for photochemically and thermally reacting water with said halogen to produce hydrogen halide and oxygen;

means for separating said oxygen from said hydrogen halide;

means for producing concentrated hydrohalic acid by solvating said hydrogen halide with dilute hydrohalic acid; and means for providing electrical power storage concurrently with hydrogen and oxygen production by utilizing a cell charging current density greater than a cell discharge current density, to produce more molecular hydrogen and halogen on charging than that which is consumed on discharging.

17. The method of claim 16, further comprising means for providing electrical power storage concurrently with hydrogen and oxygen production by charging for a longer period of time than a time of discharge.

18. A system for producing molecular hydrogen and halogens from hydrohalic acid in solution with transition metal halide complexes comprising:

means for using photolytic energy to excite a transition metal halide complex in solution with a hydrohalic acid, causing a metal ion-ligand to be photochemically reduced to a lower oxidation state, and halide ions to be oxidized to molecular halogen;

means for continuously removing said molecular halogen from the presence of the photolytic reaction; and means for using electrical energy to electrolyze said photochemically reduced, transition metal halide complexes in solution with said hydrohalic acid, causing said metal ion-ligand to be electrolytically oxidized to a higher oxidation state of that species, and hydrogen ions to be reduced to molecular hydrogen.

19. A continuous load leveling and hydrogen and oxygen production system comprising:

means for using photolytic energy to excite a transition metal halide complex in solution with a hydrohalic acid, causing a metal ion-ligand to be photochemically reduced to a lower oxidation state, and halide ions to be oxidized to molecular halogen;

means for continuously removing said molecular halogen from the presence of the photolytic reaction;

means for using electrical energy to electrolyze said photochemically reduced, transition metal halide complexes in solution with said hydrohalic acid, causing said metal ion-ligand to be electrolytically oxidized to a higher oxidation state of that species, and hydrogen ions to be reduced to molecular hydrogen;

means for photochemically and thermally reacting water with said molecular hydrogen to produce hydrogen halide and oxygen;

means for separating said oxygen from said hydrogen halide; and means for producing concentrated hydrohalic acid by solvating said hydrogen halide with dilute hydrohalic acid, wherein said system utilizes a cell having a current discharge density and a current charging density and said charging an discharging having a period of time.

20. The system of claim 19, further comprising means for providing electrical power storage concurrently with hydrogen and oxygen production by utilizing a cell charging current density greater than a cell discharge current density, to produce more molecular hydrogen and halogen on charging than that which is consumed on discharging.

21. The method of claim 19, further comprising means for providing electrical power storage concurrently with hydrogen and oxygen production by charging for a longer period of time than a time of discharge.

22. The method of claim 19, 20, or 21, further comprising means for the production of potable water and electrical power from a contaminated water feedstream by combining said hydrogen and said oxygen in a fuel cell.

23. The method of claim 16, 18, or 19, further comprising means for the recovery of excess thermal energy.

* * * * *